US009563019B2

(12) United States Patent
Shin et al.

(10) Patent No.: US 9,563,019 B2
(45) Date of Patent: Feb. 7, 2017

(54) LASER BEAM MIXING APPARATUS AND METHOD OF SEALING ORGANIC LIGHT EMITTING DIODE DISPLAY USING THE SAME

(75) Inventors: Hyun-Cheul Shin, Yongin (KR); Won-Woong Jung, Yongin (KR); Je-Kil Ryu, Yongin (KR); Kyong-Teog Lee, Yongin (KR)

(73) Assignee: Samsung Display Co., Ltd., Samsung-ro, Giheung-Gu, Yongin-si, Gyeonggi-Do (KR)

( * ) Notice: Subject to any disclaimer, the term of this patent is extended or adjusted under 35 U.S.C. 154(b) by 2093 days.

(21) Appl. No.: 12/503,317

(22) Filed: Jul. 15, 2009

(65) Prior Publication Data
US 2010/0014807 A1    Jan. 21, 2010

(30) Foreign Application Priority Data

Jul. 17, 2008  (KR) .................. 10-2008-0069619

(51) Int. Cl.
| G02B 6/00 | (2006.01) |
| G02B 6/32 | (2006.01) |
| G02B 6/28 | (2006.01) |
| G02B 6/42 | (2006.01) |

(52) U.S. Cl.
CPC .............. G02B 6/32 (2013.01); G02B 6/2848 (2013.01); G02B 6/4226 (2013.01)

(58) Field of Classification Search
CPC .................................................. G02B 6/4226
USPC ...... 385/53, 57, 60, 63, 66, 68, 94, 115, 121
See application file for complete search history.

(56) References Cited

U.S. PATENT DOCUMENTS

| 4,146,299 A * | 3/1979 | Wellington et al. ............ 385/59 |
| 5,859,947 A * | 1/1999 | Kiryuscheva et al. ....... 385/136 |
| 2004/0240489 A1* | 12/2004 | Teramura et al. ................ 372/6 |
| 2005/0213890 A1* | 9/2005 | Barnes et al. .................. 385/55 |

FOREIGN PATENT DOCUMENTS

| JP | 58-48015 | 3/1983 |
| JP | 4-236473 | 8/1992 |
| KR | 10-2007-0083009 | 8/2007 |

\* cited by examiner

*Primary Examiner* — Ryan Lepisto
*Assistant Examiner* — Erin Chiem
(74) *Attorney, Agent, or Firm* — Robert E. Bushnell, Esq.

(57) ABSTRACT

A laser beam mixing apparatus to convert a laser beam bundle into a single laser beam having a uniform energy density. The laser beam mixing apparatus includes: a barrel to adjust a distance between a multi-core optical cable and an optical lens included therein, to convert a laser beam bundle into a single beam; and a stage to adjust the position and angle a single-core optical cable with respect to the optical lens, to align the core of the single-core optical cable with the center of the single beam.

13 Claims, 14 Drawing Sheets

LASER BEAM MIXING APPARATUS AND METHOD OF SEALING ORGANIC LIGHT EMITTING DIODE DISPLAY USING THE SAME

CROSS-REFERENCE TO RELATED APPLICATION

This application claims priority to and the benefit of Korean Patent Application No. 10-2008-0069619 filed in the Korean Intellectual Property Office on Jul. 17, 2008, the disclosure of which is incorporated herein, by reference.

BACKGROUND OF THE INVENTION

1. Field of the Invention

Aspects of the present invention relate to a laser beam mixing apparatus, and a method of sealing an organic light emitting diode (OLED) display using the laser beam mixing apparatus.

2. Description of the Related Art

Lasers are being increasingly used for fine-patterning and sealing semiconductors, because lasers can highly concentrate energy in a narrow region. A laser beam does not have uniform energy over the entire cross-section thereof, although the laser beam is barely diffused while traveling. That is, energy flow in the cross-section of the laser beam is concentrated in the center, according to a Gaussian distribution.

Optical cables for transmitting laser beams include multi-core optical cables and single-core optical cables. A multi-core optical cable may be required to be connected to a single-core optical cable, in some applications. When laser light is transmitted through a multi-core optical cable, a dispersed beam pattern is produced, and thus, the multi-core optical cable has lower beam quality than that of the single-core optical cable, which transmits a more coherent beam pattern.

SUMMARY OF THE INVENTION

An exemplary embodiment of the present invention provides a laser beam mixing apparatus to output a laser beam that is uniformly distributed in a core, to maintain a uniform energy density.

Another exemplary embodiment of the present invention provides a method of sealing an OLED display that maintains a uniform energy density over a sealing region of the OLED display, to improve sealing quality.

A laser beam mixing apparatus, according to an exemplary embodiment of the present invention, includes: a barrel to adjust a distance between a multi-core optical cable and an optical lens included therein, to convert a laser beam bundle into a single beam; and a stage to adjust the position and angle of a single-core optical cable, with respect to the optical lens, to align the core of the single-core optical cable with the single beam.

According to an exemplary embodiment of the present invention, the barrel may include a first barrel, a second barrel, and a coupler to connect the first and second barrels. The first barrel has a first cable connector connected to the multi-core optical cable, which is formed at one side thereof, and a female thread formed on the inner face of an opposing thereof. The second barrel includes a male thread, which is combined with the female thread of the first barrel, and houses the optical lens.

According to an exemplary embodiment of the present invention, the coupler includes a first connector connected to the first barrel, and a second connector connected to the second barrel.

According to an exemplary embodiment of the present invention, the first connector may include a first arch cut formed along the circumference thereof, and a first straight cut that extends from the first arch cut, to one end of the first connector. The second connector may include a second arch cut formed along the circumference thereof, and a second straight cut that extends from the second arch cut to an opposing end of the second connector.

According to an exemplary embodiment of the present invention, the first connector may include a first tightening member that extends through the first straight cut, to tighten the first connector. The second connector may include a second tightening member that extends through the second straight cut, to tighten the second connector.

According to an exemplary embodiment of the present invention, the stage may include a tilt stage to adjust the angle of the single-core optical cable, a second cable connector provided at one side thereof, and a position adjustment stage to adjust the position of the tilt stage.

According to an exemplary embodiment of the present invention, the tilt stage may include: a first tilt member having a single beam transmission inlet, which is fixed to the position adjustment stage; a second tilt member opposing the first tilt member, having the second cable connector, to aligning the single-core optical cable with the single beam; a spacing unit provided between the first tilt member and the second tilt member, to separate the first tilt member and the second tilt member; a biasing unit to bias the first tilt member toward second tilt member; and an adjusting member attached to the first tilt member, to adjust the position of the spacing unit.

According to an exemplary embodiment of the present invention, the second cable connector may be disposed at the center of the second tilt member, the biasing unit may include tension springs disposed at four points around the second cable connector, and the spacing unit may include a first ball and a second ball, diagonally disposed at corners of the second tilt member, with the single connector disposed therebetween.

According to an exemplary embodiment of the present invention, the second tilt member may include: a first tilting protrusion corresponding to the first ball and tilting downward from the second tilt member, toward the first tilt member; and a second tilting protrusion corresponding to the second ball and tilting upward from the second tilt member, toward the first tilt member.

According to an exemplary embodiment of the present invention, the adjusting member may include: a first adjusting member screwed into a hole formed at one side of the first tilt member and having an end that supports the first ball; and a second adjusting member screwed into another hole formed in the first tilt member and having an end that supports the second ball.

According to an exemplary embodiment of the present invention, the position adjustment stage may include: a Z stage to adjust the position of the tilt stage in a z-axis direction; a Y stage to adjust the position of the Z stage in a y-axis direction; and an X stage to adjust the position of the Y stage in an x-axis direction.

According to an exemplary embodiment of the present invention, the X stage may include: an X fixed member that is fixed to a base; an X moving member that moves in an x-axis direction the length of the barrel; an X guide member that is formed on the X fixed member, to guide the X moving member; and an X adjusting member that is attached to the X fixed member and connected to the X moving member.

According to an exemplary embodiment of the present invention, the Y stage may include: a Y fixed member that is fixed to the X moving member; a Y moving member that moves in a y-axis direction; a Y guide member formed on the Y fixed member, to guide the Y moving member; and a Y adjusting member that is attached to the Y fixed member and connected to the Y moving member.

According to an exemplary embodiment of the present invention, the Z stage may include: a first Z moving member provided on the Y moving member; a second Z moving member that moves in a z-axis direction, as inclined faces of the first Z moving member move in the x-axis direction, while supporting the tilt stage; a Z fixed member attached to the Y moving member, a guide pin inserted into a slot of the second Z moving member; and a Z adjusting member attached to the Z fixed member and connected to the first Z moving member.

A method of sealing an organic light emitting diode (OLED) display, according to another exemplary embodiment of the present invention, includes: converting a laser beam bundle, from a multi-core optical cable, into a single beam; adjusting a single-core optical cable to align the core thereof with the center of the single beam; and heating a sealant provided between a front substrate and a rear substrate of the OLED display, using the laser beam transmitted through the single-core optical cable, to bond the front substrate and the rear substrate to each other.

According to an exemplary embodiment of the present invention, the sealant may be formed of a frit.

According to an exemplary embodiment of the present invention, the barrel converts a laser beam bundle into a single beam, and the stage aligns the single-core optical cable with the center of the single beam, to uniformly distribute the laser beam in the single core, to thereby maintain a uniform energy density.

Furthermore, according to an exemplary embodiment of the present invention, an OLED display is sealed with a laser beam having a uniform energy density, to maintain the same energy density over the sealing region and improve sealing quality.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EXEMPLARY EMBODIMENTS

Figure 1:
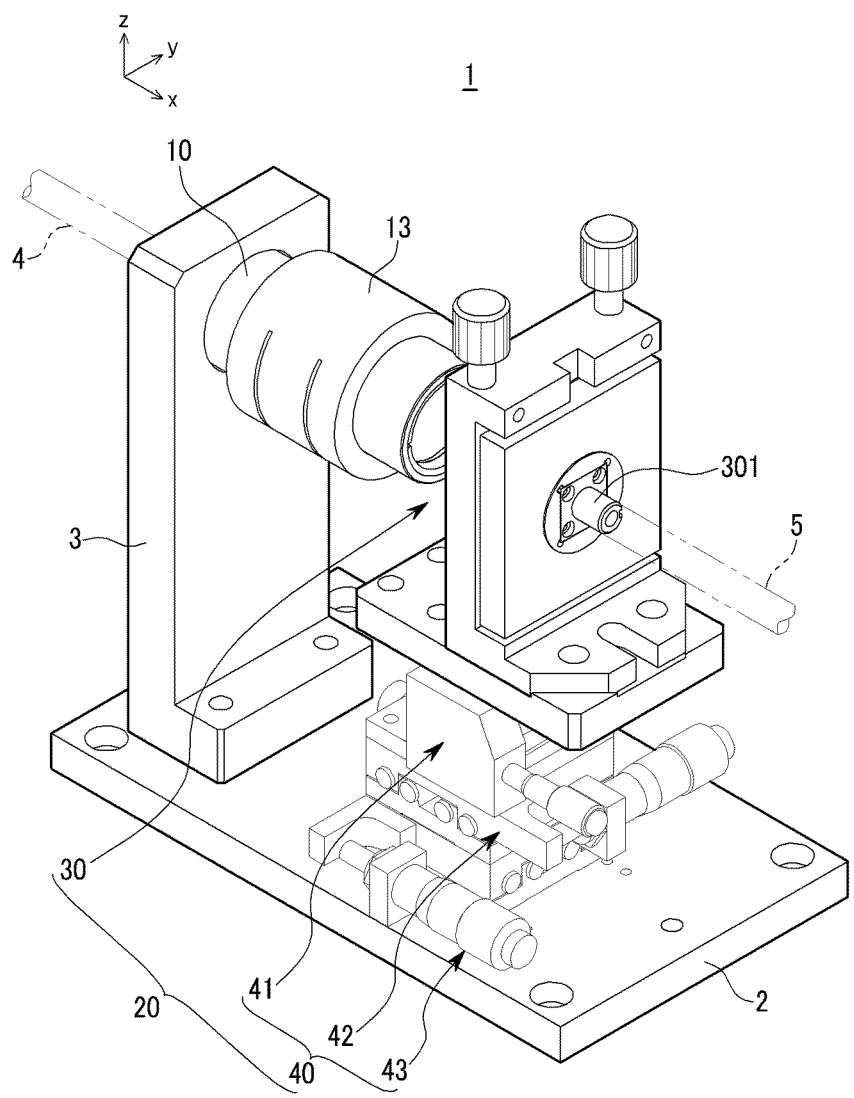
FIG. 1 is a perspective view of a laser beam mixing apparatus according to an exemplary embodiment of the present invention.

Reference will now be made in detail to the exemplary embodiments of the present invention, examples of which are illustrated in the accompanying drawings, wherein like reference numerals refer to the like elements throughout. The exemplary embodiments are described below, in order to explain the aspects of the present invention, by referring to the figures.

Figure 2:
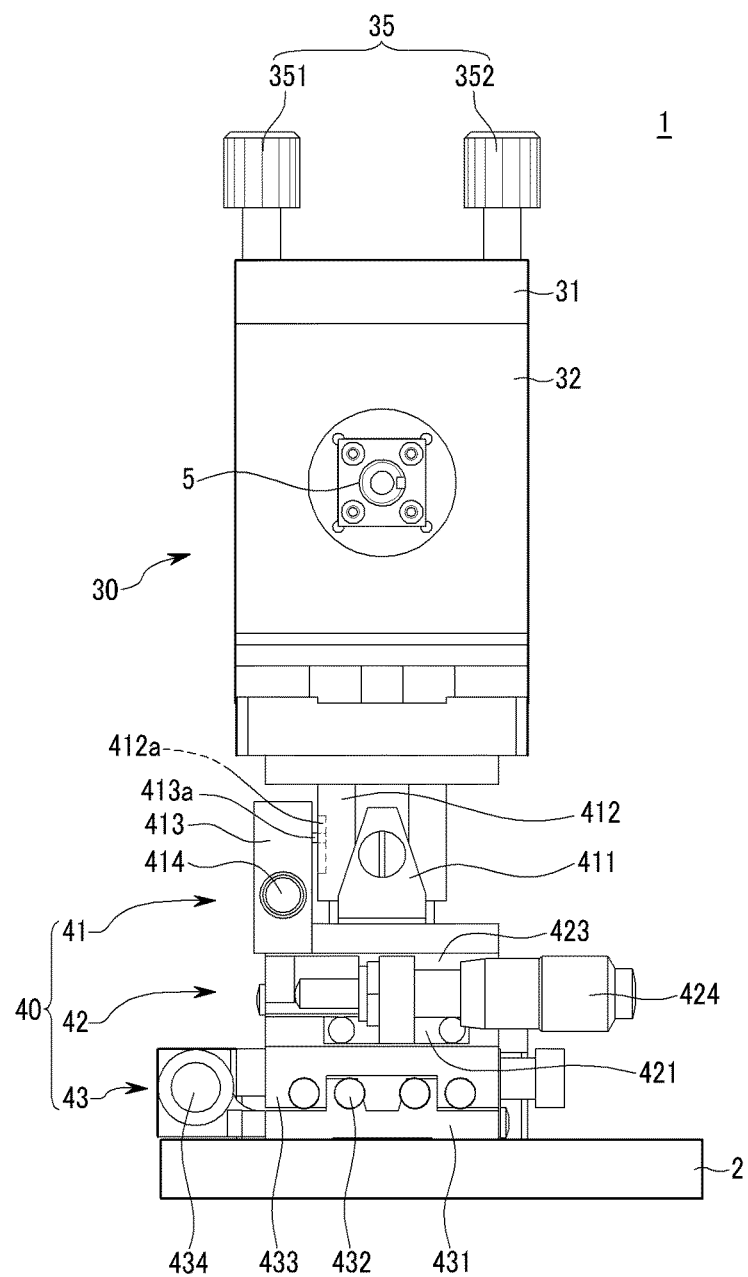
FIG. 2 is a front view of FIG. 1.

FIG. 1 is a perspective view of a laser beam mixing apparatus 1, according to an exemplary embodiment of the present invention, and FIG. 2 is a front view of the laser beam mixing apparatus 1. Referring to FIGS. 1 and 2, the laser beam mixing apparatus 1 includes a barrel 10 and a stage 20.

The barrel 10 is attached to a support 3 mounted on a base 2, and the stage 20 is mounted on the base 2. A multi-core optical cable 4 is connected to the barrel 10, and a single-core optical cable 5 is connected to the stage 20.

Figure 10:
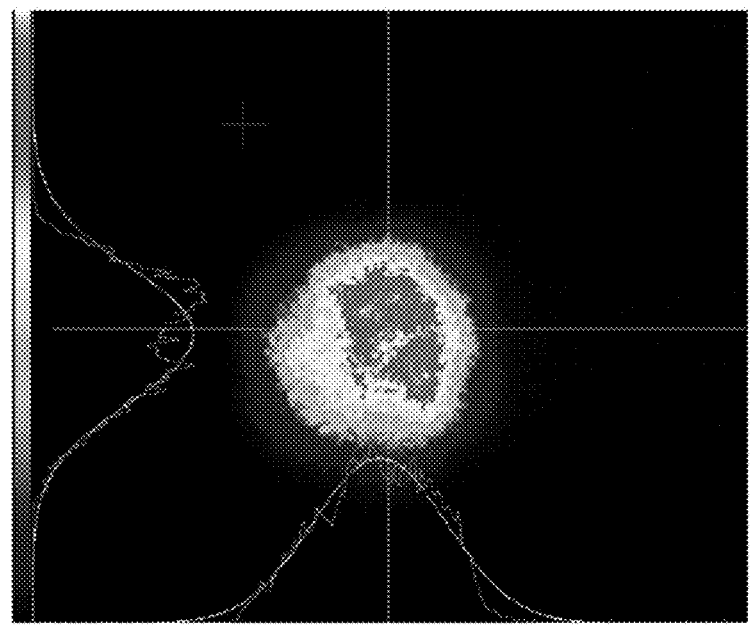
FIG. 10 shows energy distribution in a single beam obtained by mixing a laser beam bundle of FIG. 9.
Figure 11:
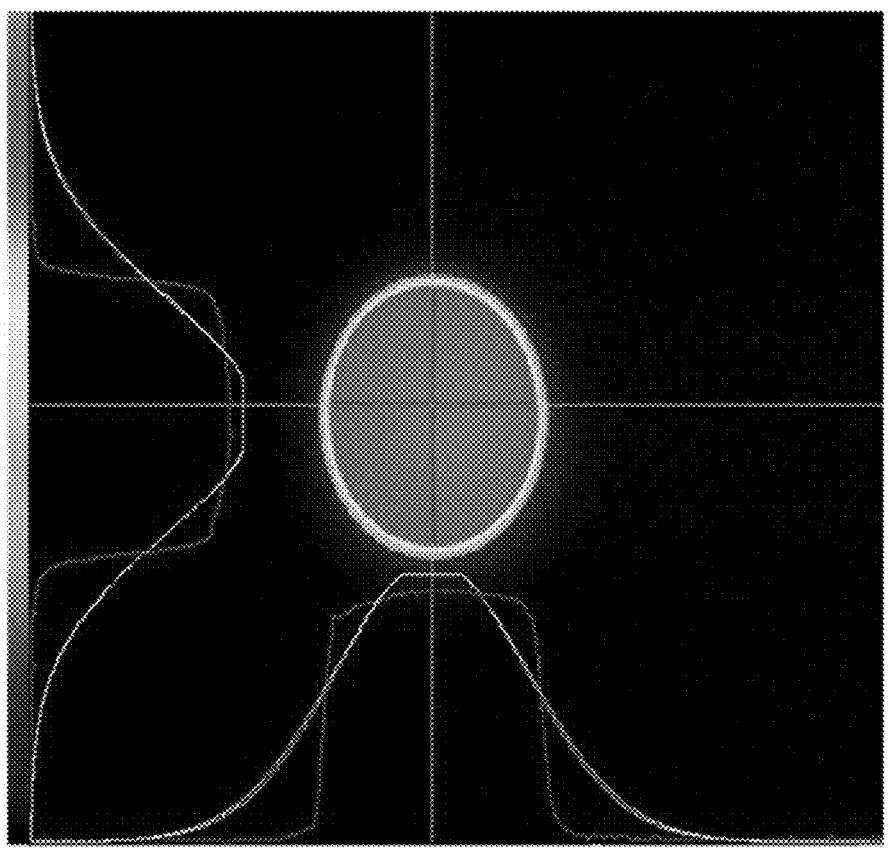
FIG. 11 shows energy distribution of a single beam having a center aligned with a single core.

The laser beam mixing apparatus 1 converts laser beams (laser beam bundle) transmitted through the multi-core optical cable 4 into a single beam, using the barrel 10 (refer to FIG. 10). The laser beam mixing apparatus 1 adjusts the position and angle of a single core of the single-core optical cable 5 with the stage 20, to align the single core with the center of the single beam (refer to FIG. 11).

Figure 3:
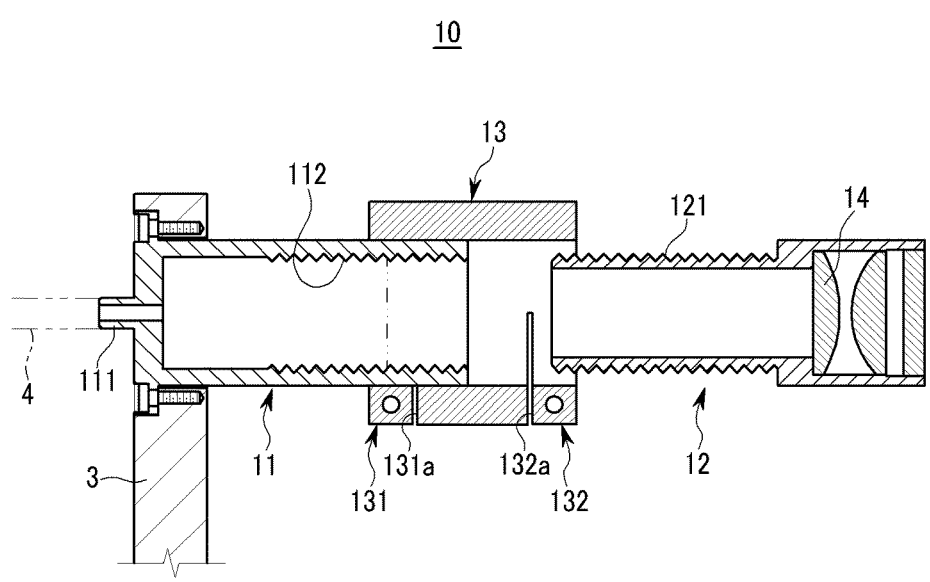
FIG. 3 is a cross-sectional view of a barrel connecting part of FIG. 1.

FIG. 3 is a cross-sectional view of the barrel 10 illustrated in FIG. 1. Referring to FIG. 3, the barrel 10 includes a first barrel 11, a second barrel 12, a coupler 13, and an optical lens 14. The barrel 10 converts the laser beam bundle form the multi-core optical cable 4, into a single beam. The barrel 10 adjusts the distance between the optical lens 14 and the laser beam bundle to perform the conversion.

For convenience, an x-axis direction corresponds to the length of the barrel 10, a y-axis direction corresponds to the width of the barrel 10, and a z-axis direction corresponds to the height of the stage 20, which is perpendicular to the xy plane.

The first barrel 11 is attached to the support 3, and has a bundle connector 111 formed at one side thereof, and a female thread 112 formed on the inner face of the other side thereof. The bundle connector 111 is connected to the multi-core optical cable 4, and the female thread 112 is connected to the second barrel 12.

The second barrel 12 has a male thread 121 formed on the outer face thereof, such that the male thread 121 can be combined with the female thread 112 of the first barrel 11. The second barrel 12 houses the optical lens 14 and is provided opposite to the first barrel 11, to output the single beam (refer to FIG. 10). The optical lens 14 is configured such that it converts the laser beam bundle into the single beam. The length of a combined portion of the male thread 121 and the female thread 112 is adjusted, to control the distance between the laser beam bundle and the optical lens 14.

The coupler 13 strengthens the combined portion of the first barrel 11 and the second barrel 12 and prevents the second barrel 12 from drooping, due to its weight, when the second barrel 12 is drawn out of the first barrel 11. That is, the coupler 13 is provided such that one side of the coupler 13 is connected to the first barrel 11, and the other side thereof is connected to the second barrel 12.

Figure 4:
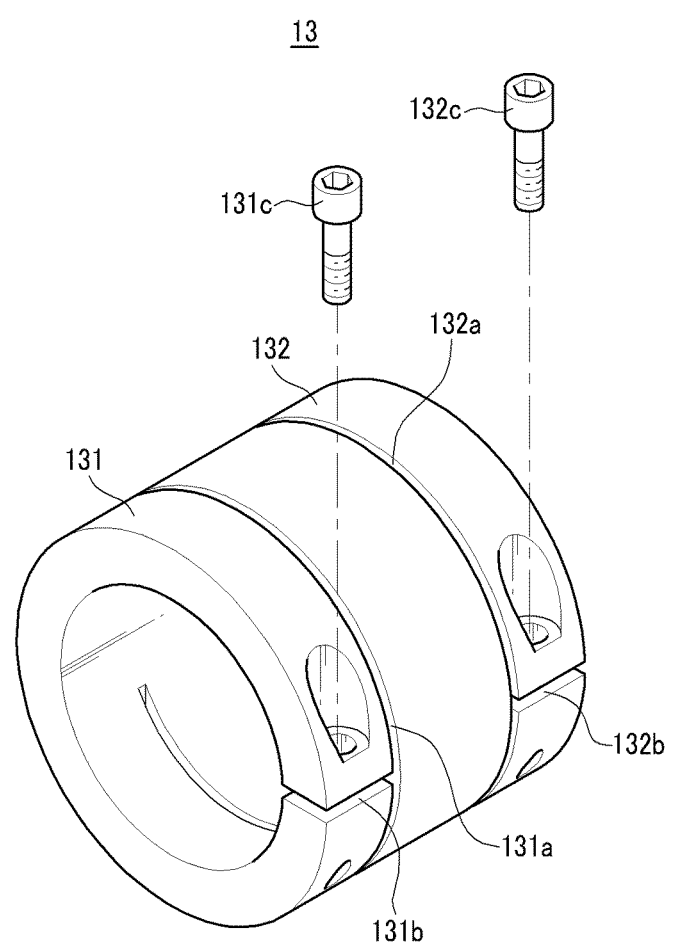
FIG. 4 is a perspective view of a coupler.

FIG. 4 is a perspective view of the coupler. Referring to FIG. 4, the coupler 13 includes a first connector 131 and a second connector 132 that are disposed at opposing sides of the coupler 13. The first and second connectors 131, 132 are respectively connected to the first barrel 11 and the second barrel 12.

The first connector 131 includes a first arch cut 131a formed along the circumference thereof, and a first straight cut 131b that extends from the first arch cut 131a, to one end of the first connector 131. Accordingly, the first connector 131 can be tightened around the first barrel 11 by compressing the first connector 131.

The second connector 132 includes a second arch cut 132a formed along the circumference thereof, and a second straight cut 132b that extends from the second arch cut 132a, to one end of the second connector 132. Accordingly, the second connector 132 can be tightened around the second barrel 12 by compressing the second connector 132.

The first connector 131 includes a first tightening member 131c that penetrates the first straight cut 131b, to tighten the first connector 131. The second connector 132 includes a second tightening member 132c that penetrates the second straight cut 132b, to tighten the second connector 132. When the first connector 131 is tightened using the first tightening member 131c, the first connector 131 is connected to the first barrel 11. When the second connector 132 is tightened using the second tightening member 132c, the second connector 132 is connected to the second barrel 12. Accordingly, the coupler 13 can strengthen the barrel 10, to effectively prevent the second barrel 12 from drooping.

Figure 5:
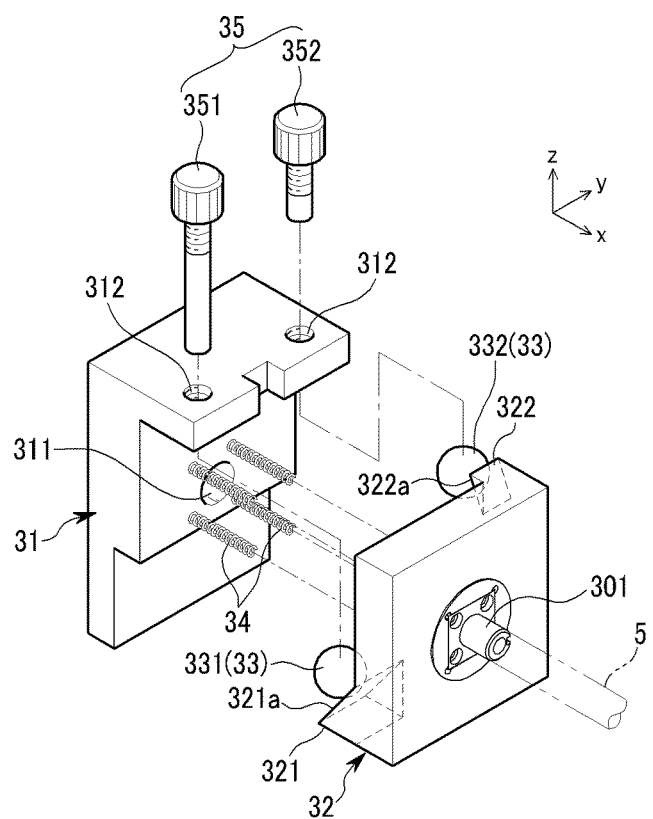
FIG. 5 is a perspective view of a tilt stage of FIG. 1.
Figure 6:
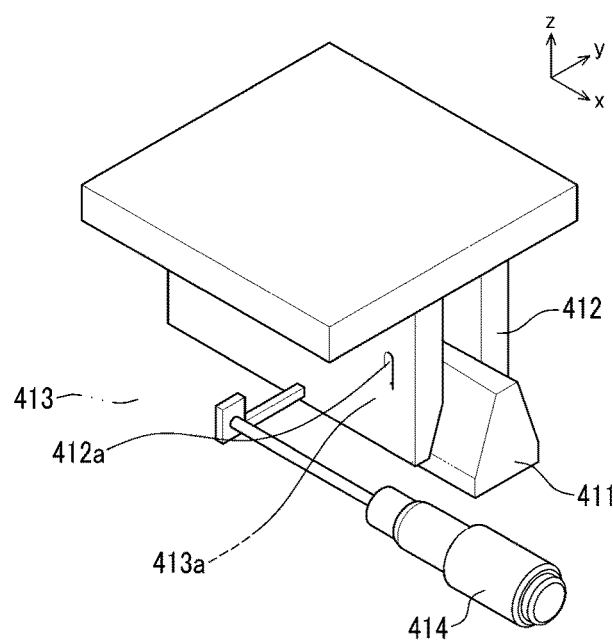
FIG. 6 is an exploded perspective view of a Z stage of FIG. 1.
Figure 7:
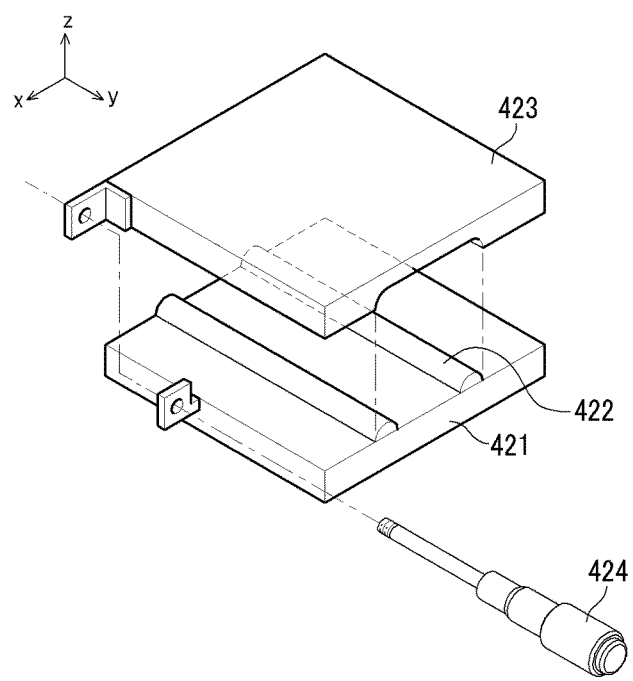
FIG. 7 is an exploded perspective view of a Y stage of FIG. 1.
Figure 8:
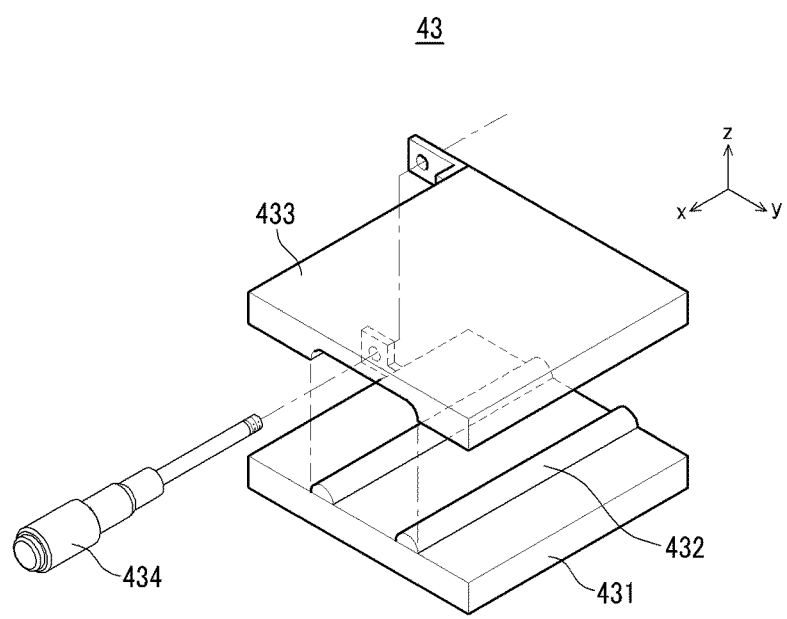
FIG. 8 is an exploded perspective view of an X stage of FIG. 1.

FIG. 5 is a perspective view of a tilt stage of FIG. 1, FIG. 6 is an exploded perspective view of a Z stage of FIG. 1, FIG. 7 is an exploded perspective view of a Y stage of FIG. 1, and FIG. 8 is an exploded perspective view of an X stage of FIG. 1. Referring to FIGS. 5, 6, 7, and 8, the stage 20 adjusts the position and angle of the single core of the single-core optical cable 5, opposite to the optical lens 14 of the barrel 10. That is, the stage 20 aligns the single core with the center of the single beam output from the barrel 10.

Referring back to FIGS. 1 and 2, the stage 20 includes a tilt stage 30 and a position adjustment stage 40. The tilt stage 30 includes a connector 301 provided at one side thereof, to connect the single-core optical cable to the tilt stage 30. The tilt stage 30 adjusts the angle of the single-core optical cable 5, which is connected to the connector 301. The tilt stage 30 is mounted on the position adjustment stage 40, such that the position adjustment stage 40 adjusts the position of the tilt stage 30.

Referring to FIG. 5, the tilt stage 30 is constructed such that it can three-dimensionally adjust the angle of the connector 301, which is provided opposite to the barrel 10. The tilt stage 30 includes a first tilt member 31, a second tilt member 32, a spacing unit 33, a biasing unit 34, and an adjusting member 35.

The first tilt member 31 includes a single beam transmission inlet 311 and is fixed to the position adjustment stage 40. Accordingly, the position of the first tilt member 31 is adjusted by the position adjustment stage 40, and the fixed state of the first tilt member 31 is maintained when the angle of the tilt stage 30 is adjusted.

The second tilt member 32 is disposed opposite to the first tilt member 31 and is combined with the first tilt member 31 to change the angle of the connector 301, when the angle of the tilt stage 30 is adjusted. That is, the second tilt member 32 is moved, while the first tilt member 31 is fixed.

The connector 301 is disposed at the center of the second tilt member 32, in order to align the core of the single-core optical cable 5 with the center of the single beam. That is, the connector 301 is located at the adjustment center of the second tilt member, whose angle can be adjusted in the 3-dimensions.

The spacing unit 33 is provided between the first tilt member 31 and the second tilt member 32. The spacing unit 33 supports the first tilt member 31 and the second tilt member 32, and also maintains a gap therebetween. The biasing unit 34 pulls together the first tilt member 31 and the second tilt member 32. Accordingly, the spacing unit 33 and the biasing unit 34 change the orientation of the second tilt member 32, with respect to the first tilt member 31, and maintain the changed orientation.

The adjusting member 35 is screwed into holes 312 of the first tilt member 31 and supports the spacing unit 33. More specifically, the biasing unit 34 includes four tension springs disposed around the connector 301, to stably bias the second tilt member 32 against the first tilt member 31.

The spacing unit 33 may include a first ball 331 and a second ball 332, in order to adjust the angle of the second tilt member 32 in three-dimensional space. The first ball 331 and the second ball 332 are diagonally disposed at respective corners of the second tilt member 32, on opposing sides of the connector 301.

Accordingly, the second tilt member 32 is combined with the first tilt member 31, according to the tension of the biasing unit 34, while being supported by the first ball 331 and the second ball 332. The first tilt member 31 maintains a three-dimensional angle adjustable state. Furthermore, the second tilt member 32 includes a first tilting protrusion 321 and a second tilting protrusion 322, which are formed at positions respectively corresponding to the first ball 331 and the second ball 332.

The first tilting protrusion 321 corresponds to the first ball 331 and forms a tilting face 321a that tilts downward toward the first tilt member 31, from the second tilt member 32. The first ball 331 moves on the tilting face 321a. As the first ball 331 moves on the tilting face 321a, the distance between the first tilt member 31 and the second tilt member 32 is adjusted, so as to control the three-dimensional angle of the second tilt member 32.

The second tilting protrusion 322 corresponds to the second ball 332 and forms a tilting face 322a that tilts upward toward the first tilt member 31, from the second tilt member 32. The second ball 332 moves on the tilting face 322a. As the second ball 332 moves on the tilting face 322a, the distance between the first tilt member 31 and the second tilt member 32 changes, so as to control the three-dimensional angle of the second tilt member 32.

The adjusting member 35 includes a first adjusting member 351 and a second adjusting member 352, to respectively adjust the positions of the first ball 331 and the second ball 332. The first adjusting member 351 is screwed into a hole 312 formed in the first tilt member 31 and supports the first ball 331, with an end disposed between the first tilt member 31 and the second tilt member 32. The second adjusting member 352 is screwed into the another hole 312 formed in the first tilt member 31 and supports the second ball 332, with an end disposed between the first tilt member 31 and the second tilt member 32.

The first tilting protrusion 321 is located at the bottom of the second tilt member 32 and the second tilting protrusion 322 is located at the top of the second tilt member 32. The first adjusting member 351 is longer than the second adjusting member 352.

In FIG. 5, the first ball 331 moves downward or upward on the tilting face 321a of the first tilting protrusion 321, to move the left part of the bottom of the second tilt member 32 in the x-axis direction, as the first adjusting member 351 moves up or down. Thus, the angle of the connector 301 is three-dimensionally adjusted.

The second ball 332 moves downward or upward on the tilting face 322a of the second tilting protrusion 322, to move the right part of the top of the second tilt member 32 in the x-axis direction, as the second adjusting member 352 moves downward or upward. Thus the angle of the connector 301 is three-dimensionally adjusted. Accordingly, the core of the single-core optical cable 5 is aligned with the center of the single beam transmitted through the barrel 10 (refer to FIG. 11).

Prior to alignment of the core with the center of the single beam, the position adjustment stage 40 adjusts the position of the tilt stage 30, to arrange the connector 301 and the core, in front of the barrel 10. For example, the position adjustment stage 40 includes a Z stage 41, a Y stage 42, and an X stage 43.

Referring to FIG. 6, the Z stage 41 adjusts the position of the tilt stage 30 in the z-axis direction. Referring to FIG. 7, the Y stage 42 adjusts the position of the Z stage 41 in the y-axis direction. Referring to FIG. 8, the X stage 43 adjusts the position of the Y stage 42 in the x-axis direction.

More specifically, the X stage 43 includes an X fixed member 431, an X guide member 432, an X moving member 433, and an X adjusting member 434. The X fixed member 431 is fixed to the base 2, and the X guide member 432 is formed on the X fixed member 431, in the x-axis direction. The X moving member 433 is combined with the X guide member 432, through a groove, and is movable in the x-axis direction.

The X adjusting member 434 is attached to the X fixed member 431, and one end thereof is connected to the X moving member 433. For example, the X adjusting member 434 is formed as a micrometer and moves the X moving member 433 in the x-axis direction, according to a rotating operation of a handle thereof.

Referring to FIG. 7, the Y stage 42 includes a Y fixed member 421, a Y guide member 422, a Y moving member 423, and a Y adjusting member 424. The Y fixed member 421 is fixed to the X moving member 433, and the Y guide member 422 is formed on the Y fixed member 421, in the y-axis direction. The Y moving member 423 is combined with the Y guide member 422, through a groove, and is movable in the y-axis direction.

The Y adjusting member 424 is attached to the Y fixed member 421, and one end thereof is connected to the Y moving member 423. For example, the Y adjusting member 424 is formed as a micrometer and moves the Y moving member 423 in the y-axis direction, according to a rotating operation of a handle thereof.

Referring to FIG. 6, the Z stage 41 includes a first Z moving member 411, a second Z moving member 412, a Z fixed member 413, and a Z adjusting member 414. The first Z moving member 411 is provided on the Y moving member 423 and is movable in the x-axis direction. The top of the section of the first Z moving member 411 is narrower than the bottom thereof, and the height of the side faces thereof, is gradually increased in the x-axis direction. That is, the first Z moving member 411 has inclined faces at both sides thereof, in the y-axis direction, and the inclined faces have a variable width in the x-axis and z-axis directions.

The second Z moving member 412 is fixed to the tilt stage 30, to support the tilt stage 30, and has inclined faces corresponding to the inclined faces of the first Z moving member 411. Accordingly, the second Z moving member 412 is moved in the z-axis direction, as the first Z moving member 411 is moved in the x-axis direction, to vertically move the tilt stage 30 in the z-axis direction.

The Z fixed member 413 is fixed to the Y moving member 423 and includes a guide pin 413a that is inserted into a slot 412a of the second Z moving member 412. The guide pin 413a is fixed to the Z fixed member 413 and is inserted into the slot 412a of the second Z moving member 412, and thus, the movement of the second Z moving member 412 in the z-axis direction is guided and restricted.

The Z adjusting member 414 is attached to the Z fixed member 413, and one end thereof is connected to the first Z moving member 411. For example, the Z adjusting member 414 is formed as a micrometer and moves the first Z moving member 411, which is connected to one end thereof, in the x-axis direction, according to a rotating operation of a handle thereof.

The laser beam mixing apparatus 1 converts a laser beam bundle oscillated from the multi-core optical cable 4, which is connected to the barrel 10, into a single beam in the barrel 10, and adjusts the position of the core of the single-core optical cable 5, by moving the position adjustment stage 40 and the tilt state 30, to align the core with the center of the single beam.

Figure 12:
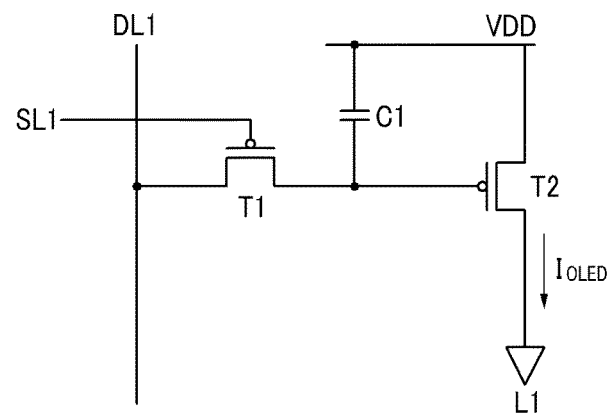
FIG. 12 is a schematic diagram showing a sub-pixel circuit structure of an organic light emitting diode (OLED) display that was sealed using the laser beam mixing apparatus of FIG. 1.

A method of sealing an OLED display using the laser beam mixing apparatus 1, according to the present exemplary embodiment, will now be explained. First, the OLED display 6 is explained. FIG. 12 is a schematic diagram showing a sub-pixel circuit structure of the OLED display that is sealed using the laser beam mixing apparatus illustrated in FIG. 1, and FIG. 13 is a cross-sectional view of the OLED display illustrated in FIG. 12.

Figure 13:
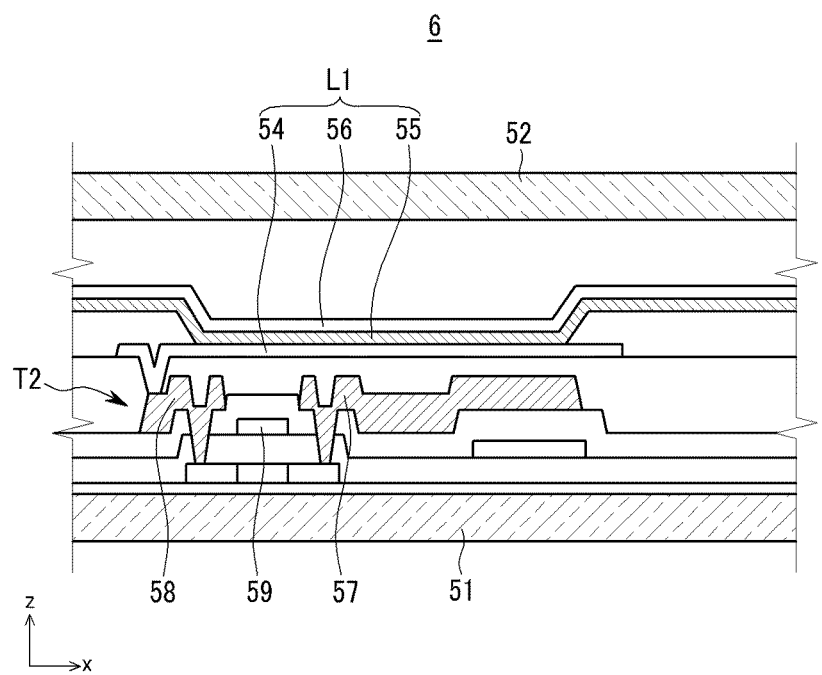
FIG. 13 is a cross-sectional view of the OLED display illustrated in FIG. 12.

Referring to FIGS. 12 and 13, a sub-pixel of the OLED display 6 includes an organic light emitting element L1 and a driving circuit. The organic light emitting element L1 includes an anode 54, an organic emission layer 55, and a cathode 56. The driving circuit includes at least two thin film transistors and at least one storage capacitor C1. The thin film transistors generally include a switching transistor T1 and a driving transistor T2.

The switching transistor T1 is connected to a scan line SL1 and a data line DL1, and transmits a data voltage input to the data line DL1, to the driving transistor T2, according to a switching voltage input to the scan line SL1. The storage capacitor C1 is connected between the switching transistor T1 and a power supply line VDD, and stores a voltage corresponding to the difference between the voltage transmitted from the switching transistor T1 and a voltage supplied from the power supply line VDD.

The driving transistor T2 is connected to the power supply line VDD, and the storage capacitor C1, and provides an output current $I_{OLED}$ in proportion to the square of the difference between the voltage stored in the storage capacitor C1 and its threshold voltage, to the organic light emitting element L1. The organic light emitting element L1 emits light according to the output current $I_{OLED}$.

The driving transistor T2 includes a source electrode 57, a drain electrode 58, and a gate electrode 59. The anode 54 of the organic light emitting element L1 can be connected to the drain electrode 5 of the driving transistor T2. The configuration of the sub-pixel is not limited to the aforementioned example, and can be varied.

A front substrate 52 and a rear substrate 51 are sealed together with a sealant, with a gap therebetween to protect driving circuits and organic light emitting elements formed on the rear substrate 51. The method of sealing the organic light emitting diode (OLED) display includes a converting operation performed in the laser beam mixing apparatus 1, an alignment operation, and a bonding operation to bond the two substrates to each other.

Figure 9:
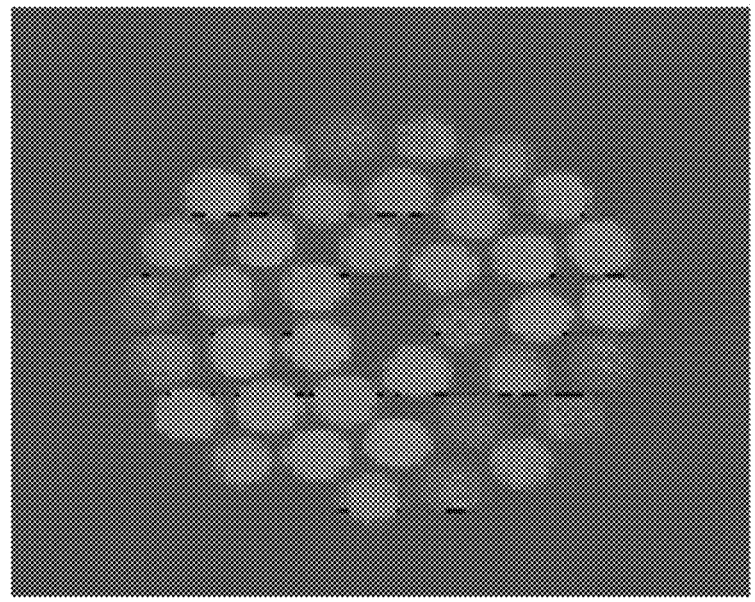
FIG. 9 is a cross-sectional view of a laser beam bundle in a multi-core optical cable.

The converting operation mixes a laser beam bundle of the multi-core optical cable 4, to convert the laser beam bundle into a single beam. The laser beam bundle of FIG. 9 is converted into the single beam of FIG. 10.

The alignment operation adjusts the position and angle of the core of the single-core optical cable 5, to align the core with the center of the single beam. The single beam of FIG. 10 forms a center-adjusted laser beam of FIG. 11. The bonding operation heats the sealant provided between the front substrate 52 and the rear substrate 51, of the OLED display 6, to bond the substrates 52, 51 to each other, using the center-adjusted laser beam, which transmitted through the core of the single-core optical cable 5.

Figure 14:
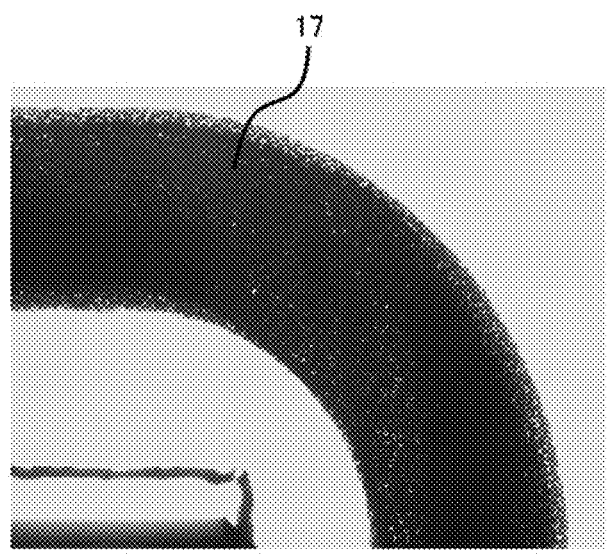
FIG. 14 is a partial top plan view of a sealing line in an OLED display employing a conventional sealing method.
Figure 15:
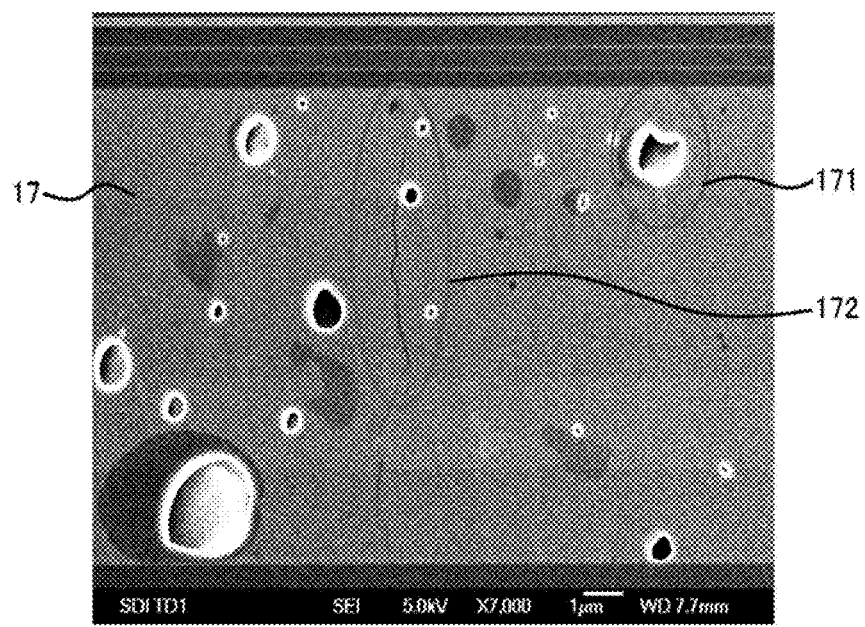
FIG. 15 is a partially enlarged view of FIG. 14.
Figure 16:
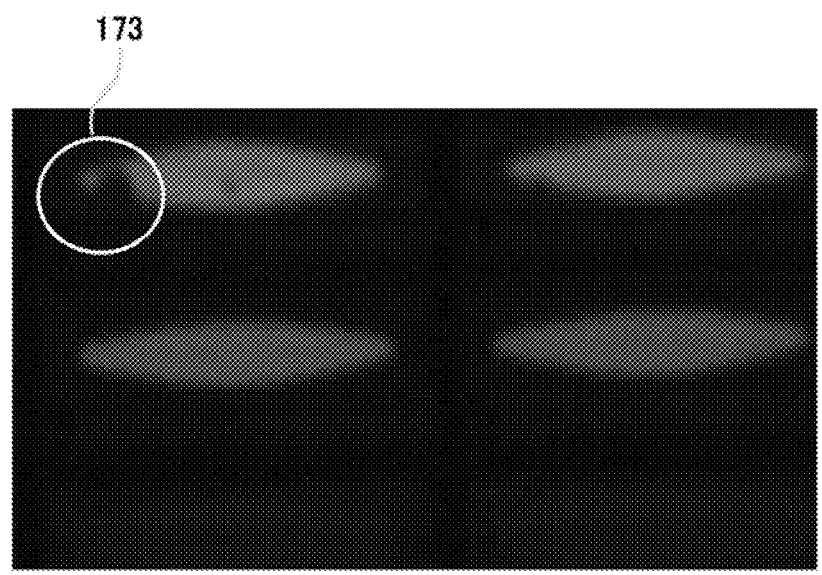
FIG. 16 shows a poor turn-on state of an OLED display.
Figure 17:
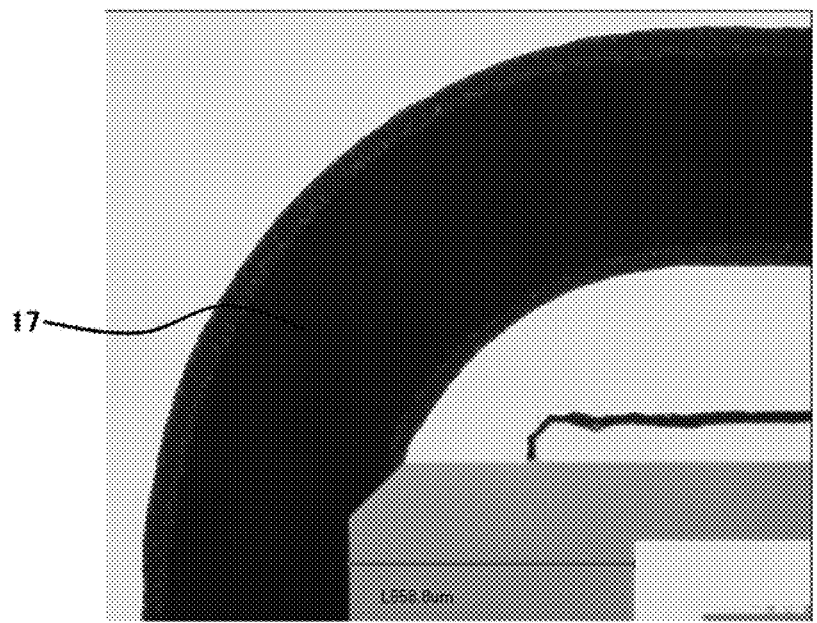
FIG. 17 is a partial top plan view of a sealing line in an OLED display employing a sealing method, according to an exemplary embodiment of the present invention.

FIG. 14 is a partial top plane view of a sealing line in an OLED display employing a conventional sealing method, FIG. 15 is a partial enlarged view of FIG. 14, FIG. 16 shows a poor turn-on state of an OLED display, and FIG. 17 is a partial top plan view of a sealing line in an OLED display employing the sealing method according to an exemplary embodiment of the present invention. Referring to FIGS. 14 and 15, when a sealant 17 is heated with a single beam, according to a conventional sealing method, bubbles 171 and cracks 172 are formed in the sealant 17, which results in poor sealing. Referring to FIG. 16, the poor turn-on 173 occurs due to the infiltration of moisture.

Referring to FIG. 17, when a sealant 7 is heated with a single beam having a center aligned with a core, according to the present exemplary embodiment, bubbles and/or cracks are not formed in the sealant 7. That is, the sealing method, according to the exemplary embodiment of the present invention, results in improved sealing quality, as compared to the conventional sealing method.

Figure 18:
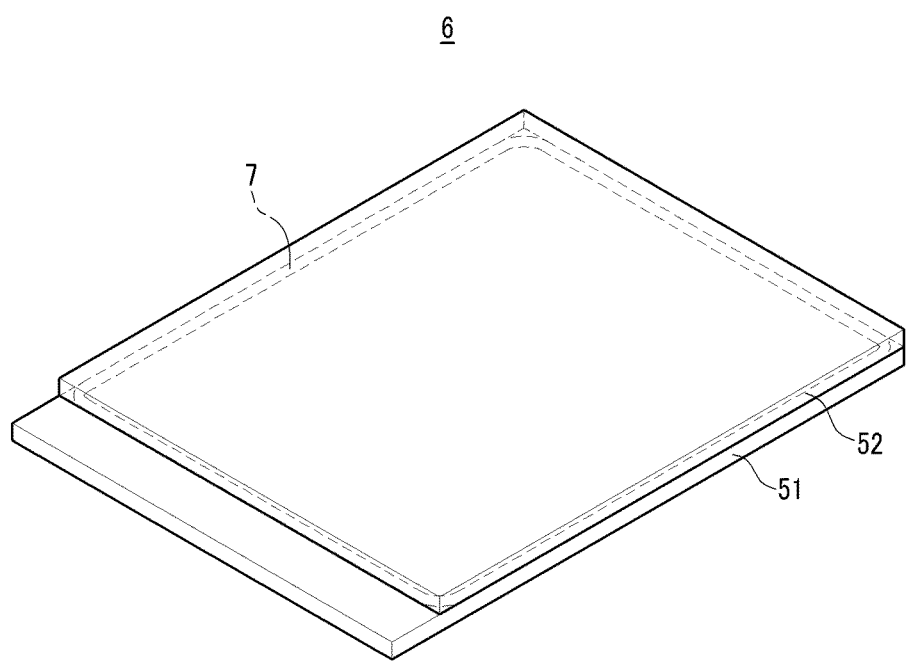
FIG. 18 is a perspective view of an OLED display employing the sealing method, according to an exemplary embodiment of the present invention.

FIG. 18 is a perspective view of the OLED display employing the sealing method, according to an exemplary embodiment of the present invention. As an example, the sealant 7 can be formed of a frit. Referring to FIG. 18, the single beam having its center aligned with the core of the single-core optical cable 4, according to the present exemplary embodiment, can heat the sealant 7 provided between the front substrate 52 and the rear substrate 51, to bond the front substrate 52 to the rear substrate 51.

As shown in FIG. 17, the sealant 7 does not have bubbles or cracks, and can maintain a high-quality seal.

Although a few exemplary embodiments of the present invention have been shown and described, it would be appreciated by those skilled in the art that changes may be made in these exemplary embodiments, without departing from the principles and spirit of the invention, the scope of which is defined in the claims and their equivalents.

What is claimed is:

1. A laser beam mixing apparatus, comprising:
   a barrel comprising an optical lens to adjust the distance between a multi-core optical cable and the optical lens and to convert a laser beam bundle projected from the multi-core cable into a single beam that is projected through a single-core optical cable; and
   a stage to adjust the position and angle of the single-core optical cable with respect to the optical lens, so as to align the single beam with the core of the single-core optical cable.

2. The laser beam mixing apparatus of claim 1, wherein the barrel comprises:
   a first barrel comprising,
      a first cable connector disposed at one side thereof, to connect the multi-core optical cable to the first barrel, and
      a female thread formed on the inner face of an opposing side thereof;
   a second barrel inserted into the first barrel to house the optical lens, comprising a male thread to mate with the female thread of the first barrel; and
   a coupler to strengthen the connection between the first barrel and the second barrel.

3. The laser beam mixing apparatus of claim 2, wherein the coupler comprises:
   a first connector to mate with the first barrel; and
   a second connector to mate with the second barrel.

4. The laser beam mixing apparatus of claim 3, wherein:
   the first connector has a first arch cut formed along the circumference of the first connector, and a first straight cut that extends from the first arch cut to an end of the first connector; and
   the second connector has a second arch cut formed along the circumference of the second connector, and a second straight cut that extends from the second arch cut to an end of the second connector.

5. The laser beam mixing apparatus of claim 4, wherein:
   the first connector includes a first tightening member that extends through the first straight cut, to tighten the first connector; and
   the second connector includes a second tightening member that extends through the second straight cut, to tighten the second connector.

6. The laser beam mixing apparatus of claim 5, wherein the first tightening member tightens the first connector of the coupler to the barrel by compressing the first connector due to the first arch cut and the first straight cut, and the second tightening member tightens the second connector of the coupler to the barrel by compressing the second connector due to the second arch cut and the second straight cut.

7. The laser beam mixing apparatus of claim 2, the second barrel being spaced-apart from the single-core optical cable, the single-core optical cable being external to the barrel.

8. The laser beam mixing apparatus of claim 2, the coupler arranged on an outer circumference of the first and second barrels.

9. The laser beam mixing apparatus of claim 2, wherein one side of the coupler is connected to the first barrel and another side of the coupler is connected to the second barrel.

10. The laser beam mixing apparatus of claim 1, wherein the stage comprises:
   a tilt stage to adjust the angle of the single-core optical fiber;
   a second cable connector to connect the single-core optical cable to the tilt stage; and
   a position adjustment stage to adjust the position of the tilt stage.

11. The laser beam mixing apparatus of claim 1, the barrel being connected to the multi-core optical cable while being spaced-apart from the single-core optical cable.

12. A laser beam mixing apparatus comprising:
   a lens converting a laser beam bundle into a single beam;
   a barrel housing the lens, and enabling adjustment of the distance between a multi-core optical cable and the lens;
   a tilt stage enabling adjustment of the position and angle of a single-core optical cable, with respect to the optical lens, so as to align the single beam with the core of the single-core optical cable; and
   an adjustment stage enabling adjustment of the position of the tilt stage.

13. The laser beam mixing apparatus of claim 12, the barrel being attached to the multi-core optical cable and being spaced-apart from the single-core optical cable.

* * * * *